United States Patent [19]

Ohgawara et al.

[11] Patent Number: 5,365,357
[45] Date of Patent: Nov. 15, 1994

[54] COLOR LIQUID CRYSTAL DISPLAY HAVING COLOR FILTERS AND LIGHT BLOCKING LAYERS IN THE PERIPHERY

[75] Inventors: Masao Ohgawara, Yokohama; Hiroyoshi Tsubota, Tokyo, both of Japan

[73] Assignee: Asahi Glass Company Ltd., Tokyo, Japan

[21] Appl. No.: 65,526

[22] Filed: May 24, 1993

Related U.S. Application Data

[63] Continuation of Ser. No. 844,875, Mar. 3, 1992, abandoned, which is a continuation of Ser. No. 337,834, Apr. 14, 1989, abandoned.

[30] Foreign Application Priority Data

Apr. 21, 1988 [JP] Japan ............... 63-96856
Nov. 1, 1988 [JP] Japan ............... 63-274462

[51] Int. Cl.⁵ ..................................... G02F 1/1335
[52] U.S. Cl. ....................................... 359/67; 359/62; 359/68; 359/73
[58] Field of Search ........................ 359/54, 67, 73, 68, 359/87, 62

[56] References Cited

U.S. PATENT DOCUMENTS

| | | | |
|---|---|---|---|
| 4,412,214 | 10/1983 | Tanaka et al. | 340/765 |
| 4,519,678 | 5/1985 | Komatsubara | 359/74 X |
| 4,779,957 | 10/1988 | Suginoya et al. | 359/74 X |
| 4,802,743 | 2/1989 | Takao et al. | 359/75 X |
| 4,828,364 | 5/1989 | Saito et al. | 350/339 F |
| 4,837,098 | 6/1989 | Shimamura | 359/68 |
| 4,904,058 | 2/1990 | Kato et al. | 350/335 |
| 4,906,073 | 3/1990 | Hunahata et al. | 350/347 R |
| 4,924,243 | 5/1990 | Sato et al. | 359/81 |
| 4,927,493 | 5/1990 | Yamazaki et al. | 350/336 X |
| 4,964,702 | 10/1990 | Sugimoto et al. | 350/339 R |
| 4,974,939 | 12/1990 | Yamazaki et al. | 350/336 |
| 4,975,145 | 12/1990 | Yamazaki et al. | 350/336 X |
| 5,101,289 | 3/1992 | Takao et al. | 359/100 X |

FOREIGN PATENT DOCUMENTS

| | | |
|---|---|---|
| 0246842 | 11/1987 | European Pat. Off. |
| 2595155 | 9/1987 | France . |
| 5481810 | 1/1981 | Japan ............... 350/335 |
| 60-243638 | 12/1985 | Japan . |
| 61-185086 | 11/1986 | Japan . |
| 62-210425 | 9/1987 | Japan . |
| 62-269928 | 11/1987 | Japan . |
| 63-113420 | 5/1988 | Japan . |
| 62-17689 | 7/1988 | Japan ............... 350/339 F |
| 1009420 | 1/1989 | Japan . |
| 8504962 | 11/1985 | WIPO ............... 359/67 |

Primary Examiner—William L. Sikes
Assistant Examiner—Ron Trice
Attorney, Agent, or Firm—Oblon, Spivak, McClelland, Maier & Neustadt

[57] ABSTRACT

A color liquid crystal display device comprising light shielding layers and color filters on the inner surface of a cell, wherein similar light shielding layers and color filters are disposed also in a peripheral region outside of a display region which is equipped with groups of striped row and column electrodes opposed mutually to form pixels for display. The respective patterns of the light shielding layers and the color filters are the same in both the display region and the peripheral region. A liquid crystal layer formed in the display device has a twist angle of 160° to 300° and a retardation compensator composed of a film is superposed on such layer so as to compensate the elliptical polarization. And a nonselective voltage is applied continuously to the scanning electrodes in the peripheral region so as to maintain the peripheral pixels in a light-shielded state, thereby rendering the display easier to be seen. Furthermore, due to overlaps of the color filters and the light shielding layers in both the display region and the peripheral region, the gap between the substrates is retained substantially uniform to minimize the nonuniformity of the background color.

13 Claims, 2 Drawing Sheets

COLOR LIQUID CRYSTAL DISPLAY HAVING COLOR FILTERS AND LIGHT BLOCKING LAYERS IN THE PERIPHERY

This application is a continuation of application Ser. No. 07/844,875, filed on Mar. 3, 1992, now abandoned, which was a continuation of application Ser. No. 07/337,834, filed Apr. 14, 1989, now abandoned.

BACKGROUND OF THE INVENTION

1. Field of the Invention

The present invention relates to a color liquid crystal display (LCD) device adapted for high density display in colors, and also to a method for driving such a display device.

2. Discussion of the Background

It is noticeable of late that the industrial attention is concentrated on color LCD devices of a constitution having light shielding layers and color filters on the inner surface thereof.

One example of the above is known as an active matrix LCD device where an active matrix element such as TFT (Thin Film Transistor) or MIM (Metal-Insulator-Metal) used practically in a liquid crystal television receiver and so forth is provided for each of the pixels.

In such active matrix LCD devices, each pixel is driven in a static or similar mode, so that the requirement for gap control of the liquid crystal layer is not exactly strict.

However, it is difficult to realize a great dimensional increase of such active matrix LCD device suited generally for use in a small-sized portable television receiver or the like. Accordingly, there have been some difficulties in attaining adequate application to any large-sized personal computer, word processor and so forth where high-density display characteristics are requisite.

Meanwhile, there may exist some cases of employing, instead of the active matrix device used customarily heretofore, a twisted nematic (TN) type dot matrix LCD device which is driven in a dynamic mode.

Since the TN type dot matrix LCD device is so constituted that an active matrix element is not provided for each of the pixels, it becomes possible to manufacture a large-sized high density display device with facility, whereas a problem arises with regard to deterioration of the display quality.

For example, in a display device with a capacity of 640×400 dots employed generally in a personal computer or the like, the driving duty factor reaches 1/200 or so to eventually bring about some disadvantages that the viewing angle is extremely narrow and the contrast is rendered very low. Consequently, there are achievable merely eight colors at most with R-G-B in color display, and it has been substantially impossible in practical use to realize a display with gray scales.

Recently a super-twisted nematic (STN) type LCD device has been developed as means for realizing a high density dot matrix display by the technique of increasing the twist angle of liquid crystal molecules between the two electrodes to induce a steep voltage-transmission curve.

According to this technique, however, the value of $\Delta n.d$, which is product of the birefringence $\Delta n$ of the liquid crystal and the thickness d of the liquid crystal layer in the LCD device, is substantially in a range of 0.8 to 1.2 microns, and a high contrast is obtainable merely in the combination of specific hues alone such as yellowish green and dark blue, bluish purple and light yellow, and so forth.

Since such a LCD device is not suited for monochromatic or black-and-white display as mentioned, there exists a disadvantage that multi-color or full-color display is impossible in combination with a micro color filter.

Meanwhile, there is proposed an improved technique as disclosed in EP 246842, wherein an inverse-twisted liquid crystal cell or a retardation film are laminated to constitute a retardation compensator on such a super-twisted liquid crystal cell for dot display, and the elliptical polarization caused in the dot-display liquid crystal cell is compensated by the inverse-twisted liquid crystal cell to eliminate undesired coloring peculiar to the STN type LCD device, thereby achieving a display similar to the monochromatic one.

Due to employment of such a retardation compensator, there is obtainable a desired display substantially equal to a monochromatic one, hence raising a possibility of color display by the use of a color filter in combination with such a display device.

In particular, by combining the above color filter with a light shielding layer and disposing them in a cell, it becomes possible to realize a color LCD device apparently having a high contrast without any positional deviation.

However, in the STN type LCD device which utilizes birefringence with the liquid crystal cell having such a twist angle, even a slight variation in the thickness of the liquid crytal layer is visually represented as color due to the birefringence so that, unless the thickness of the liquid crystal layer corresponding to an inter-substrate gap is retained to be remarkably uniform, there occurs nonuniformity of the background color to consequently blur the display with conspicuous deterioration of the display quality.

Therefore, it has been required to develop an improved color LCD device which is capable of ensuring high display quality while maintaining sufficient uniformity with facility despite any large area of the inter-substrate gap.

SUMMARY OF THE INVENTION

The present invention has been accomplished in an attempt to solve the problems observed in the aforementioned prior art. And its object resides in providing an improved color LCD device with light shielding layers and color filters formed on the inner surface of a cell, wherein similar light shielding layers and color filters are arranged also in the periphery of a display region where groups of electrodes are opposed to each other to perform visual representation.

According to one aspect of the present invention, there is provided a color LCD device employing thin-film light shielding layers and thick-film color filters. Particularly in the display region to perform visual representation with electrode groups opposed to each other, color filters are disposed in pixel portions while light shielding layers are disposed between the pixels. Furthermore, in the outer periphery of the display region, light shielding layers similar to those disposed between the pixels of the display region are disposed on the entire surface of the peripheral region, and also there are disposed color filters which are structurally similar to those in the pixel portions of the display region and have an area corresponding to 50 to 100% of the filter area in the pixel portions.

According to another aspect of the present invention, there is provided a color LCD device employing thick-film light shielding layers and thick-film color filters. In a display region to perform visual representation with electrode groups opposed to each other, color filters are disposed in pixel portions while light shielding layers are disposed between the pixels. And the outer periphery of the display region is furnished with light shielding layers and color filters equal in pattern to those in the display region.

According to a further aspect of the present invention, there is provided a color LCD device employing thick-film light shielding layers and thick-film color filters. In a display region to perform visual representation with electrode groups opposed to each other, color filters are disposed in the pixel portions while light shielding layers are disposed between the pixels. And the outer periphery of the display region is entirely furnished with light shielding layers similar to those between the pixels in the display region, and also with color filters which are similar to those in the display region and have an area corresponding to 5 to 50% of the filter area in the display region.

In the LCD device of the present invention where color filters and light shielding layers are arranged on the inner surface of its substrate, the constitution of the color filters and the light shielding layers in the periphery of the display region can be changed by the thickness of the color filters and the light shielding layers disposed in the display region, hence maintaining further higher uniformity with respect to the thickness of the whole liquid crystal layer in the cell.

The LCD device of the present invention is so constituted that fundamentally a nematic, smectic or similar liquid crystal material is contained in the gap between a pair of substrates aligned and furnished with groups of electrodes, and color filters and light shielding layers are arranged on the inner surface of its cell.

More specifically, it is a dot matrix LCD device comprising striped row electrode groups disposed on one substrate and striped column electrode groups disposed on another substrate orthogonally and opposite thereto, and a liquid crystal material is contained and sealed between the substrates.

Although the present invention may be applied to an ordinary TN type LCD device, greater effects are attainable by the application to an STN type LCD device where high uniformity is required with regard to the thickness of the liquid crystal layer, particularly to a monochromatic STN type LCD device which employs a retardation compensator to achieve a black-and-white display without the provision of any color filter.

In this monochromatic STN type LCD device, there may be used a combination of an ordinary STN type LC cell where a layer of liquid crystal molecules having a twist angle of 160° to 300° is contained between electrodes-furnished substrates, with a retardation compensating LC cell where a layer of liquid crystal molecules having an inverse twist angle of a value substantially equal to the above or having an angular deviation of 60° to 120° therefrom is contained between substrates, or with a birefringence compensator which is composed of a plate capable of performing birefringence compensation similarly to such a retardation compensator. A pair of polarizing plates are disposed outside of the display LC cell and the birefringence compensator. In this case, the twist angle, aligning direction, direction of polarizing axis and so forth may be adjusted properly in such a manner as to render the display similar to a monochromatic one.

In the monochromatic STN type LCD device equipped with such a birefringence compensator, the elliptical polarized light having passed through the display LC cell is compensated with regard to the retardation, so that the display can be rendered substantially monochromatic without any color filter.

In the present invention, both the color filters and the light shielding layers are disposed on the inner surface of the display LC cell.

The color filter may be composed of a film having a thickness of one to several microns and formed by the known method of dyeing, color ink printing, photoetching with optosetting color ink, electrodeposition or the like.

Meanwhile, the light shielding layer may be composed of either a thick film having a thickness of 0.8 to several microns and formed by the known method of black dyeing, black ink printing, photoetching with optosetting black ink, electrodeposition or the like; or a thin metallic film having a thickness less than 0.5 micron and formed by nickel plating, chromium deposition or the like.

Such color filters and light shielding layers may be interposed between the substrate and the electrode, or between the electrode and the aligning film; or one may be disposed below the electrode while another above the electrode.

In the present invention, such light shielding layers and color filters are arranged in the display region where electrode groups are mutually opposed to perform visual representation; and furthermore, similar light shielding layers and color filters are arranged in the peripheral region which is outside of the display region and inside of the seal.

In the present invention, pixels are formed with electrodes opposed to each other. More specifically, in the aforementioned dot matrix type LCD device, groups of striped row electrodes and groups of striped column electrodes orthogonal thereto are superposed on each other to form pixels.

In the color LCD device of the present invention where the pixel portions in the display region are completely covered with the color filters, the pattern of the color filters is so determined as to become larger than the pattern of the openings in the light shielding layers so that the periphery of each color filter overlaps the light shielding layer between the pixels. Consequently, in the display region, there are formed overlaps where the light shielding layers are superposed partially on the color filters.

In case such thick-film light shielding layers are used, due to the overlap between the light shielding layer and the color filter, the thickness tends to become nonuniform despite the provision of a leveling layer thereon. For the purpose of reducing such nonuniformity, it is desired that the thickness of the light shielding layer be made smaller than that of the color filter.

Meanwhile, if the light shielding layers alone are formed in the peripheral region, the layer thickness in the peripheral region comes to be smaller than that in the display region, so that it is difficult to retain the inter-substrate gap uniform on the entire surface of the cell. However, in the constitution of the present invention where the layer thickness in the peripheral region can be substantially equalized to that in the display region, the inter-substrate gap is controllable to be uniform with facility on the entire surface of the cell.

The layer thickness can be rendered further uniform by providing electrodes in the peripheral region as well as in the display region, hence enabling control of the inter-substrate gap with accuracy. Since the electrodes are so formed as to have a low resistance, it is preferred that the above constitution be adopted particularly when the thickness thereof ranges from 100 to 400 nm.

In case the light shielding layers are not formed on the entire surface of the peripheral region, it is desired that a voltage be applied to the peripheral electrodes in a manner to keep the peripheral pixels in a light-shielded state, because the inter-substrate gap control is prone to be inaccurate as the peripheral region is subjected to some harmful influence from the outside, and therefore the nonuniformity of the background color needs to be less conspicuous by maintaining the peripheral pixels in a light-shielded state.

Although the present invention is adapted to be applied to a color LC optical device with color filters and light shielding layers formed between substrates and electrodes, it is also applicable to a device of a different constitution where color filters and light shielding layers are formed on electrodes.

The reason is based on the fact that the provision of color filters and light shielding layers under the electrodes brings about a better result, since the display quality is deteriorated if thick color filters and light shielding layers are existent on the electrodes.

DESCRIPTION OF THE PREFERRED EMBODIMENTS

Hereinafter the present invention will be described in detail with reference to the accompanying drawings.

Figure 1:
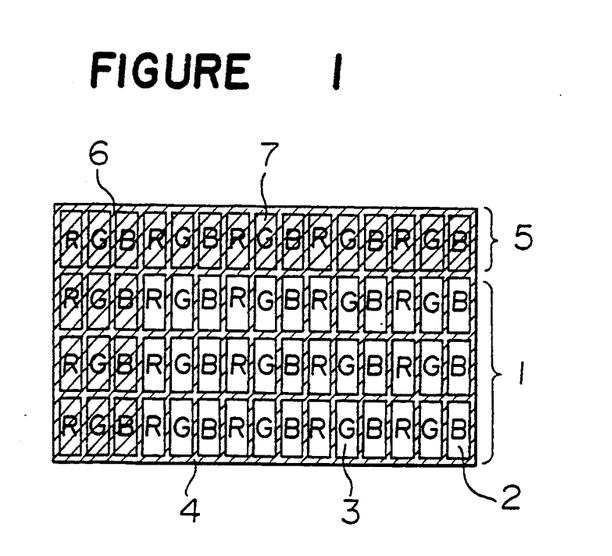
FIG. 1 is a plan view illustrating the patterns of light shielding layers and color filters in the vicinity of the boundary between a display region and a peripheral region in an exemplary constitution where thin-film light shielding layers and thick-film color filters are arranged on the inner surface of a cell.

FIG. 1 is a plan view illustrating the patterns of light shielding layers and color filters in the vicinity of the boundary between a display region and a peripheral region in an exemplary constitution of the present invention applied to a color LCD device where thin-film light shielding layers and thick-film color filters are arranged on the inner surface of its cell.

This is an enlarged view showing merely a left upper corner part of the whole color LCD device to make the invention better understood. In the actual color LCD device, a similar constitution is adopted also in each of its right upper corner part, left lower corner part and right lower corner part, and a peripheral region is formed around the display region. Such partial illustration is taken in each of other examples as well, with the left upper corner part alone shown in an enlarged view.

In FIG. 1, there are included a display region 1 where electrode groups are opposed to each other to perform visual representation, color filters 3 disposed in pixel portions 2, and light shielding layers 4 disposed between the pixels. Meanwhile, in a peripheral region 5 outside of the display region 1, light shielding layers 6 similar to those between the pixels in the display region 1 are disposed on the entire surface, and there are also disposed color filters 7 which are similar to the color filters 3 in the pixel portions of the display region 1 and each of the color filters 7 have an area corresponding to 50 to 100% of the area of each of the color filters 3.

Figure 4:
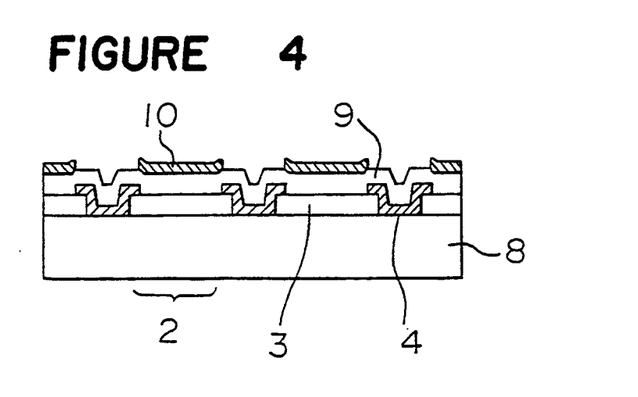
FIG. 4 is a sectional view of a substrate with light shielding layers and color filters arranged thereon.

In such a color LCD device, as shown in its sectional view of FIG. 4, the pattern of the color filters 3 is larger than the pattern of openings in the light shielding layers 4 so that the pixel portions 2 in the display region of the substrate 8 are sufficiently covered with the color filters 3, whereby the peripheries of the color filters 4 overlap the light shielding layers between the pixels. Therefore, in the display region, some partial overlaps are formed with regard to the color filters 3 and the light shielding layers 4. There are also shown a substrate 8, a leveling layer 9 formed on both the color filters 3 and the light shielding layers 4, and electrodes 10 formed on the-leveling layer 9.

According to the present invention, there are arranged, on the entire surface of the peripheral region 5 outside of the display region 1, light shielding layers 6 similar to those between the pixels in the display region 1, and also color filters 7 which are similar to those in the pixel portions of the display region and each filter 7 has an area corresponding to 50 to 100% of the area of each of the color filters 3.

Thus, in the periperal region 5 also, the light shielding layers 6 partially overlap the color filters 7 as in the display region 1 to consequently facilitate control of the gap uniformity when a cell is constituted with spacers disposed on its inner surface.

In such a color LCD device where thin-film light shielding layers and thick-film color filters are arranged on the inner surface of the cell, the light shielding layers are thinner than the color filters, so that the area of the color filters 7 in the peripheral region is equalized to 50 to 100% of the area of the color filters 3 in the pixel portions.

Particularly when the thickness of the light shielding layer is less than about 1/5 of that of the color filter, the area of the color filters 7 in the peripheral region may be the same as that of the color filters 3 in the pixel portions, whereby the mask, printing plate or the like used for forming the color filters in the display region can be utilized also for those in the peripheral region, so that only one kind of such mask or the like is needed to consequently enhance the productivity.

Although there are illustrated merely a small number of pixels in the display region, a necessary number of pixels may be provided in accordance with individual requirements, as 1920×400 dots or 1920×480 dots, for example.

In the peripheral region also, there are illustrated merely one pixel on the upper side and three pixels on the left side (or one set of three colors). However, the number of pixels in the peripheral region may be determined adequately in conformity with the width of the peripheral region. Practically, since the peripheral region has a width of several to twenty-and-odd millimeters or so, the number of pixels may be in a range of several to several tens.

It is preferred that electrodes be provided in the portions corresponding to pixels in the peripheral region similarly to those in the display region, whereby the thickness difference between the display region and the peripheral region is further reduced to obtain a better result.

The contrivances mentioned above conform to the following embodiments as well.

Figure 2:
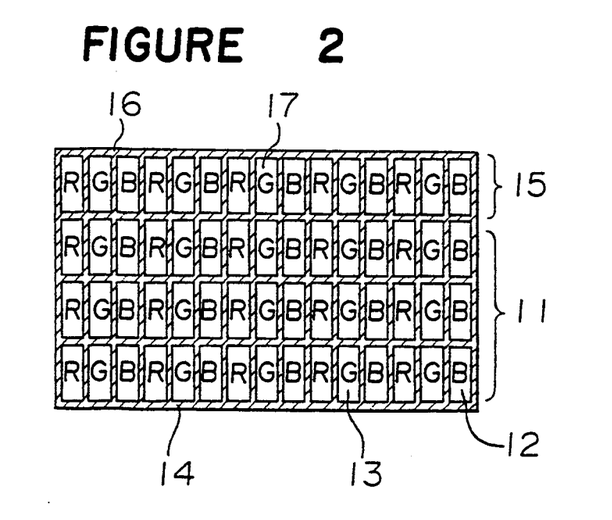
FIGS. 2 and 3 are plan views each illustrating the patterns of light shielding layers and color filters in the vicinity of the boundary between a periperal region and a display region in an exemplary constitution where thick-film light shielding layers and thick-film color filters are arranged on the inner surface of a cell.

FIG. 2 is a plan view illustrating the patterns of light shielding layers and color filters in the vicinity of the boundary between a display region and a peripheral region in another example of applying the present invention to a color LCD device where thick-film light shielding layers and thick-film color filters are arranged on the inner surface of its cell.

In a display region 11 where electrode groups are opposed to each other to perform visual representation, color filters 13 are disposed in pixel portions 12, and also light shielding layers 14 are disposed between the pixels. Furthermore, light shielding layers 16 and color filters 17 equal in pattern respectively to those in the display region 11 are provided in a peripheral region 15 outside of the display region 11.

In this constitution also, similarly to the embodiment of FIG. 1, the pattern of the color filters 13 is larger than the pattern of openings in the light shielding layers 14 so that the pixel portions 12 in the display region are sufficiently covered with color filters 13, whereby the peripheries of the color filters 13 overlap the light shielding layers between the pixels. Consequently, in the display region, some partial overlaps are formed with regard to the color filters 13 and the light shielding layers 14.

According to the present invention, there are formed, in the peripheral region 15 outside of the display region, light shielding layers 16 and color filters 17 which are similar in pattern respectively to the light shielding layers 14 and the color filters 13 in the pixel portions of the display region.

As a result, the peripheral region is also furnished with the color filters 17 and the light shielding layers 16 in the same manner as in the display region, so that if both the light shielding layers and the color filters are composed of thick films and are partially overlapped, the display region and the peripheral region come to have the same constitution, thereby facilitating control of the gap uniformity when a cell is produced with spacers disposed on its inner surface.

In this case also, the patterns of the color filters 17 and the light shielding layers 16 in the peripheral region may be the same as those of the color filters 13 in the pixel portions and the light shielding layers 14, whereby the mask, printing plate or the like used for forming the color filters can be utilized for both the display region and the peripheral region, so that only one kind of such mask or the like is needed to consequently enhance the productivity.

In this example, it is desired that electrodes be provided also in the peripheral region, and a voltage be applied thereto in such a manner as to maintain the peripheral pixels in a light-shielded state. Since the peripheral region is harmfully affected from its outside such as the sealed portion and so forth, the inter-substrate gap control is prone to become inaccurate. However, the nonuniformity of the background color can be rendered less conspicuous by maintaining the peripheral pixels in a light-shielded state as mentioned above.

In this case, the requirement is satisfied if the electrodes in the peripheral region are driven simultaneously while the electrodes in the display region are normally so disposed as to be drivable for individual pixels. Therefore, the pattern of the peripheral electrodes may be the same as that in the display region or may be wider than that as well. More specifically, in the embodiment of FIG. 2, three electrodes serving originally for R-G-B three colors may be shaped into a single electrode of a triple width substantially. In the embodiment of FIG. 2, each segment of the vertical peripheral region consists of one pixel, while each segment of the horizontal peripheral region consists of three pixels. However, in one ordinary color LCD device, the number of such pixels is mostly in a range of 10 to 100, and they may be formed by one or more electrodes.

The electrodes in the peripheral region are connected to a driving circuit, and a voltage is applied thereto in such a manner that the pixels in the peripheral region are driven to be kept in a light-shielded state. When the LCD device has a positive type constitution, a multiplex-driving selective voltage may be applied to the pixels in the peripheral region. Meanwhile, in case the LCD device is a negative type, a multiplex-driving non-selective voltage may be applied to the pixel portions in the peripheral region. Since application of such selective voltage or non-selective voltage can be effected with facility from an ordinary multiplex driving circuit, there exists no necessity of providing any additional circuit, so that an advantage is attained in manufacture of a module. It is also possible to apply a higher voltage to the pixels in the peripheral region by incorporating another circuit individually.

Figure 3:
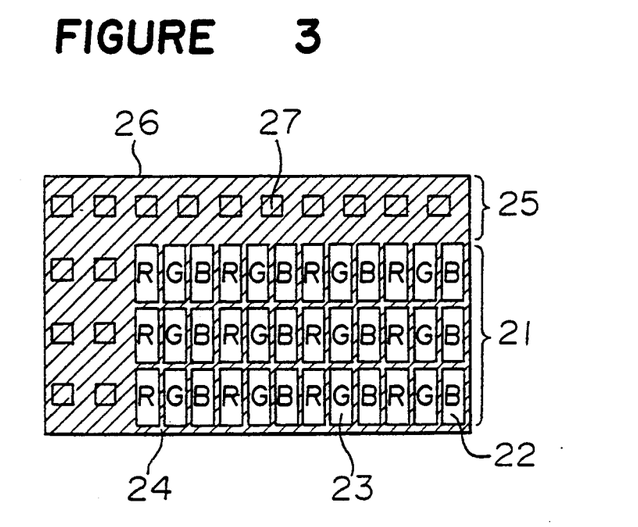

FIG. 3 is a plan view illustrating the patterns of light shielding layers and color filters in the vicinity of the boundary between a display region and a peripheral region in a further example of applying the present invention to a color LCD device where thick-film light shielding layers and thick-film color filters are arranged on the inner surface of its cell.

In a display region 21 where electrode groups are opposed to each other to perform visual representation, color filters 23 are disposed in pixel portions 22, and also light shielding layers 24 are disposed between pixels. Meanwhile in a peripheral region 25 outside of the display region, there are disposed light shielding layers 26 similar to those between the pixels in the display region, and also color filters 27 which are similar to those in the pixel portions of the display region and have an area corresponding to 5 to 50% of the area of each of the color filters 23 in the display region.

In this constitution also, similarly to the embodiment of FIG. 1, the pattern of the color filters 23 is larger than the pattern of openings in the light shielding layers 24 so that the pixel portions 22 in the display region are sufficiently covered with the color filters 23, whereby the peripheries of the color filters 21 overlap the light shielding layers between the pixels. Consequently, in the display region, some overlaps are formed with regard to the color filters 23 and the light shielding layers 24.

According to the present invention, there are formed, on the entire surface of the peripheral region 25 outside of the display region, light shielding layers 26 similar to those between the pixels in the display region, and also color filters 27 which are similar to those in the pixel portions of the display region and have an area corresponding to 5 to 50% of the area of each of the aforemontoined color filters 23 in the display region.

In this embodiment where both the color filters and the light shielding layers are composed of thick films, if the color filters 27 and the light shielding layers 26 in the peripheral region are so formed as to mutually overlap, as in the embodiment of FIG. 1, with the patterns similar to those in the display region, then the resultant film thickness becomes considerably great to eventually bring about difficulty in maintaining the desired uniformity of the inter-substrate gap in the entire display region.

In view of such circumstances, as mentioned above, the area of the color filters 27 overlapped with the light shielding layers in the peripheral region is reduced to 5 to 50% of the area of each of the color filters 23 in the pixel portions of the display region, whereby the above disadvantage is diminished and therefore control of the gap uniformity can be facilitated when a cell is produced with spacers disposed on the inner surface of the cell.

Thus, the color filters in the peripheral region may be so arranged as to have the same pattern in a condition where the pixels are arrayed similarly in the peripheral region as well. As described above, when the pattern of the color filters in the peripheral region is the same as that of the color filters in the display region, the mask, printing plate or the like used for the color filters in the display region can be utilized also for those in the peripheral region, hence ensuring enhanced productivity.

When the color filter area in the peripheral region is changed to be different from the color filter area in the display region, the pixels in the peripheral region may be arranged with the same pitch as that of the pixels in the display region on condition that the pixel arrangement in the peripheral region is the same as in the display region. Meanwhile, in the embodiment of FIG. 3 where the color filter area in the periperal region is smaller, the color filters may be formed with a pitch wider than that of the pixels in the display region.

The present invention is adapted to be applied to an STN type LCD device or SSF (surface-stabilized ferroelectric) LCD device where extremely strict control of the inter-substrate gap uniformity is requisite and monochromatic display can be effected without using any color filter.

In the present invention, the substrates constituting a liquid crystal cell may be optically isotropic ones and are composed usually of transparent glass, plastic or like material.

Electrodes are formed on such substrates, and a voltage is selectively applied between desired electrodes to drive the liquid crystal for display. The electrodes are composed usually of transparent material such as ITO ($In_2O_3$-$SnO_2$), $SnO_2$ or the like, and low-resistance leads of Al, Cr or Ti may be combined therewith in accordance with the individual requirements. And a desired patterning process is executed. A typical one is a dot matrix LCD device where a multiplicity of row and column electrode groups are existent. For example, striped 1920 electrodes are formed on one substrate while striped 400 electrodes are formed orthogonally thereto on another substrate, whereby a display capacity of 1920×400 dots is obtained.

In case electrodes are to be disposed in the peripheral region also, for example, striped 2040 electrodes are formed on one substrate while striped 440 electrodes are formed on another substrate to provide 2040×440 dots.

In the exemplary constitution of FIG. 2, a voltage is applied to the 120 left and right electrodes in the peripheral region and also to the 40 upper and lower electrodes therein in such a manner that the relevant pixels are kept in a light-shielded state, thereby reducing the nonuniformity of the background color in the peripheral region to consequently enhance the display quality. In the case of a negative type LCD device employing back light, a non-selective voltage may be applied to its peripheral region. More specifically, a non-selective voltage is applied continuously to the 20 electrodes in each of the upper and lower peripheral regions out of the striped 440 electrodes to be sequentially scanned, and peripheral regions. Accordingly, the electrodes in any peripheral region are not selected and therefore retained in a light-shielded state regardless of whether the other electrodes are selected or not.

Any of the known rubbing, oblique evaporation and other methods may be utilized for aligning the liquid crystal molecules. And the aligning treatment may be executed after the electrodes are coated with a film of inorganic material such as $SiO_2$, $TiO_2$ or $Al_2O_3$ and/or a film of organic material such as polyimide or polyamide in conformity with the individual requirements.

Any suitable ones of the known LCD elements may be employed for the spacer, sealing material, polarizing plate, reflecting plate, illumination means, driving circuit and so forth.

Besides the above, a variety of techniques utilized for the ordinary LCD devices are available within the scope not impairing the effects of the present invention.

The color LCD device of the present invention is adapted for use in personal computers, word processors and work stations as well as in any of various color display apparatus as such as liquid crystal television receivers, fish finders, radars, oscilloscopes and dot matrix display units.

In the present invention, color filters and light shielding layers partially overlap each other in both the display region and the peripheral region, so that when a cell is produced with spacers disposed on its inner surface, the inter-substrate gap can be maintained substantially uniform in each of the display and peripheral regions, hence attaining satisfactory uniformity in the gap between the substrates throughout the cell.

That is, in the constitution where the color filters and the light shielding layers partially overlap each other, it follows that, when spacers are disposed on the inner surface of the cell, the spacers are partially distributed in such overlaps as well, which then serve to thicken the inter-substrate gap.

Consequently, if the light shielding layers alone are disposed in the peripheral region, there are formed, in the display region, some portions which are partially higher than the peripheral region due to the mutual overlaps of the color filters and the light shielding layers, so that the inter-substrate gap in the display region becomes wider than that in the peripheral region to eventually form portions where the inter-substrate gap is gradually varied in the vicinity of the boundary between the display region and the peripheral region, whereby nonuniformity of the background color is prone to occur.

According to the present invention, the display region is also furnished with color filters and light shielding layers which are similar to those in the display region or have some adequate dimensions within a predetermined range. Thus, mutual overlaps of the color filters and the light shielding layers having substantially the same area as in the display region are formed also in the peripheral region, so that when spacers are disposed, the inter-substrate gap in the peripheral region is rendered substantially uniform and equal to that in the display region.

In this case, the inter-substrate gap can be controlled with a higher accuracy by the provision of electrodes in the peripheral region as well. Consequently there are formed, in the peripheral region also, mutual overlaps of the color filters, the light shielding layers and the electrodes having substantially the same area as that in the display region, so that any variation caused in the inter-substrate gap with the disposal of spacers is suppressed in the vicinity of the boundary between the peripheral region and the display region, whereby the inter-substrate gap is rendered substantially uniform even in the outermost portion of the display region to eventually avert nonuniformity of the background color.

Particularly in the constitution of FIG. 2 where the peripheral region is furnished with the frame-shaped light shielding layers and the color filters for the pixels in the same manner as the display region, it is preferred that a voltage be so applied as to keep the peripheral pixels in a light-shielded state, hence achieving enhanced control of the inter-substrate gap in the display region. Furthermore, although the uniformity of the inter-substrate gap in the peripheral region becomes lower than that in the display region, such is hardly recognized as the nonuniformity of the background color since the peripheral region is so driven as to be retained in a light-shielded state, whereby the display quality is further improved as a result. Besides the above, the display is rendered easier to be seen as the peripheral region is placed in a light-shielded state similarly to the light-shielded pixels in the display region.

Since all the pixels in the peripheral region are retained in a light-shielded state, the peripheral electrodes may be shaped into striped ones similar to those for the pixels in the display region, or a plurality of electrodes may be grouped together to form a single electrode. However, it is preferred that the peripheral electrodes be exactly in conformity with those in the display region.

Hereinafter some examples of the present invention will be described in detail with reference to the accompanying drawings.

EXAMPLE 1

As illustrated in FIGS. 1 and 4, thin-film light shielding layers of chromium were formed to a thickness of 100 nm on a glass substrate, and thick-film color filters (1056×272 dots) were formed by R-G-B three color dyeing process to a thickness of 2.0 μm on electrode portions corresponding to pixels, in such a manner that the peripheries of the color filters were overlapped with the light shielding layers. And further an overcoat film (leveling layer) of polyimide was formed thereon.

As mentioned, the surface leveling was executed by forming the overcoat film of polyimide on the color filters and the light shielding layers, but is was difficult to attain complete flatness of the surface. However, fine irregularities on the color filters were mostly leveled due to the existence of such overcoat film, and some large irregularities resulting from mutual overlaps of the color filters and the light shielding layers in the peripheries of the pixels were considerably eliminated in comparison with the conventional example using no such overcoat film.

Thereafter such leveled surface was coated with ITO ($In_2O_3$-$SnO_2$) and then patterned to form striped 960 column electrodes, and further an insulator film of $SiO_2$-$TiO_2$ was formed on the entire surface to a thickness of 100 nm. Subsequently a layer of polyimide was deposited thereon to a thickness of 70 nm or so, and rubbing was executed to form an aligning film, thereby constituting a column-electrode substrate.

Meanwhile, striped 240 row electrodes were formed on another glass substrate orthogonally to the column electrodes, and an insulator film of $SiO_2$-$TiO_2$ was formed to a thickness of 300 nm on the entire surface. Then, a layer of polyimide was deposited thereon to a thickness of 70 nm or so, and a rubbing process was executed to form an aligning film, thereby constituting a row-electrode substrate in such a manner that liquid crystal molecules have a twist angle of 240° at the time of completion of a cell by combining the row-electrode substrate with the aforementioned column-electrode substrate.

In such two substrates, striped electrodes similar to those in the display region were formed also in the peripheral region surrounding the display region.

The column-electrode substrate and the row-electrode substrate were so arranged that the twist angle of liquid crystal molecules was 240°, and a cell was constituted by sealing up the peripheries of the substrates. And a dot matrix LC cell was produced with a supply of nematic liquid crystal material therein.

A layer of polyimide was deposited to a thickness of 70 nm on a glass substrate, and it was processed by rubbing to form an aligning film. Two of such substrates were so arranged that liquid crystal molecules have a twist angle of 240° in the reverse direction with respect to the dot matrix LC cell and, after sealing at the peripheries, nematic liquid crystal material was poured therein to produce an LC cell for retardation compensation.

The dot matrix LC cell was superposed on such retardation compensating LC cell to constitute a laminated structure, and a pair of polarizing plates were disposed on the two sides thereof to manufacture a negative type LCD device.

In the LCD device thus obtained, each of the display region and the peripheral region was furnished with the color filters and the light shielding layers having the same pattern (same area) respectively, so that the gap between the substrates was rendered substantially uniform in both the display region and the peripheral region, hence ensuring a visually satisfactory color display.

It is to be noted that even if the LCD device of such constitution is modified into a positive display type with adequate adjustment of the relationship among the refringence anisotropy (Δn) of the liquid crystal material, the aligning direction and the axis of polarization thereof, since any region other than the pixel portion is covered with the light shielding layer, it is still usable as a negative type LCD device when driven by the application of a voltage to desired segments to be darkened, in a manner contrary to driving the ordinary negative type LCD device.

Therefore, this LCD device is usable apparently for negative type display regardless of whether it is produced as a negative type or positive type structurally.

COMPARATIVE EXAMPLE 1

In a conventional LCD device having the same constitution as that of Example 1 with the exception that no color filter was provided on any light shielding layer in the peripheral region, the contrast was reduced in the shape of a frame with a width of about 5 mm inside the edge of the display region, and the display quality was deteriorated.

EXAMPLES 2 and 3

Modified color LCD devices were manufactured by changing the area of the color filters on the light shielding layer in the peripheral region of Example 1 to 80% (in Example 2) and 60% (in Example 3), respectively.

In each of Examples 2 and 3, the inter-substrate gap was substantially uniform in both the display region and the peripheral region, and a visually satisfactory color display was attained. However, in Example 3, the uniformity of the inter-substrate gap was slightly lower than that in Examples 1 or 2.

EXAMPLE 4

Light shielding layers having a thickness of about 1.2 µm were formed by a dyeing process in place of the light shielding layers used in Example 1, and also color filters having a thickness of about 1.8 µm were formed by a dyeing process, and they were arranged as illustrated in FIG. 2.

In this negative type LCD device where each of the display region and the peripheral region was furnished with the color filters and the light shielding layers having the same pattern (same area) respectively, the gap between the substrates was rendered substantially uniform in both the display region and the peripheral region, thereby achieving visually satisfactory display.

EXAMPLE 5

Light shielding layers similar to those used in Example 4 were formed on the entire surface of the peripheral region as illustrated in FIG. 3, and also color filters similar to those in Example 4 were formed partially (in the area corresponding to about 15% of the color filters in the display region).

In this negative type LCD device where the color filters were formed partially on the light shielding layers in the peripheral region, the inter-substrate gap was substantially uniform in both the display region and the peripheral region to consequently realize a visually satisfactory display.

In the LCD device of such constitution where any portions other than the pixel portions are covered with the light shielding layers similarly to Example 1, it is usable apparently as a negative type LCD device regardless of whether it is produced structurally as a negative type or positive type.

EXAMPLE 6

A glass substrate was coated with ITO and then patterned as illustrated in FIG. 1 to form striped 960 column electrodes, and an insulator film of SiO$_2$-TiO$_2$ was formed to a thickness of 300 nm on the entire surface. Further thin-film light shielding layers of chromium were fromed thereon to a thickness of 100 nm, and thereafter color filters were formed by R-G-B three color dyeing process to a thickness of 2.0 µm. Subsequently a layer of polyimide was deposited thereon to a thickness of 70 nm or so, and it was processed by rubbing to form an aligning layer, thereby constituting a column-electrode substrate.

Meanwhile, striped 240 row electrodes were formed on another glass substrate orthogonally to the column electrodes, and an insulator film of SiO$_2$-TiO$_2$ was formed to a thickness of 300 nm on the entire surface. Then a layer of polyimide was deposited thereon to a thickness of 70 nm or so, and a rubbing process was executed to form an aligning film, thereby constituting a row-electrode substrate in such a manner that liquid crystal molecules have a twist angle of 240° at the time of completion of a cell by combining the row-electrode substrate with the aforementioned column-electrode substrate.

Such row-electrode substrate and column-electrode substrate were assembled as in the foregoing examples to produce a dot matrix LC cell. Subsequently an LC cell for retardation compensation was superposed thereon as in Example 1, and a pair of polarizing plates were disposed on the two sides to manufacture a negative type LCD device.

In the LCD device thus obtained, the inter-substrate gap was rendered more uniform than that in Comparative Example 1. However, the surface irregularities became greater than those in Example 1 due to the structure where the color filters and the light shielding layers were disposed on the electrodes, so that the uniformity of the inter-substrate gap was slightly inferior to that in Example 1.

Although a visually satisfactory color display was attained, the existence of the thick color filters on the electrodes caused variations in the effective voltage applied substantially to the liquid crystal layer, hence reducing the contrast as compared with Example 1 and slightly lowering the visual quality in the display.

EXAMPLE 7

Thin-film light shielding layers of chromium were formed to a thickness of 100 nm on a glass substrate, and thick-film color filters wer formed by R-G-B three color dyeing process to a thickness of 2.0 µm on electrode portions corresponding to pixels, in such a manner that the peripheries of the color filters were overlapped with the light shielding layers. And further an overcoat film (leveling layer) of transparent acrylic resin was formed thereon.

As mentioned, the surface leveling was thus executed by forming such an overcoat film of transparent acrylic resin on the color filters and the light shielding layers, but it was difficult to attain complete flatness of the surface. However, fine irregularities on the color filters were mostly leveled due to the existence of such an overcoat film, and some large irregularities resulting from mutual overlaps of the color filters and the light shielding layers in the peripheries of the pixels were eliminated considerably in comparison with the conventional example using no such overcoat film.

Thereafter such leveled surface was coated with ITO to a thickness of 240 nm and then was patterned to form striped 272 row electrodes, and further a layer of polyimide was deposited thereon to a thickness of 70 nm or so. Subsequently a rubbing process was executed to form an aligning film, thereby constituting a row-electrode substrate.

Meanwhile, striped 1056 column electrodes were formed on another glass substrate orthogonally to the row electrodes, and an insulator film of SiO$_2$-TiO$_2$ was formed to a thickness of 50 nm on the entire surface.

Then a layer of polyimide was deposited thereon to a thickness of 70 nm or so, and a rubbing process was executed to form an aligning film, thereby constituting a column-electrode substrate in such a manner that liquid crystal molecules have a twist angle of 240° at the time of completion of a cell by combining the column-electrode substrate with the aforementioned row-electrode substrate.

The row-electrode substrate and the column-electrode substrate were so arranged that the twist angle of liquid crystal molecules was 240°, and a cell was constituted by sealing up the peripheries of the substrates. And a dot matrix LC cell was produced with a supply of nematic liquid crystal material therein.

A layer of polyimide was deposited to a thickness of 70 nm on a glass substrate, and it was processed by rubbing to form an aligning film Two of such substrates were so arranged that liquid crystal molecules have a twist angle of 240° in the reverse direction with respect to the dot matrix LC cell and, after sealing at the peripheries, nematic liquid crystal material was poured therein to produce an LC cell for retardation compensation.

The dot matrix LC cell was superposed on such retardation compensating LC cell to constitute a laminated structure, and a pair of polarizing plates were disposed on the two sides thereof to manufacture a negative type LCD device.

Out of the total 1056×272 dots in the LCD device thus obtained, merely 960×240 dots alone in the central area were used for display, and a non-selective voltage was applied to the electrodes in the peripheral region place them in a light-shielded state.

In this LCD device where the display region and the peripheral region are furnished with the color filters and the light shielding layers having the same pattern (same area) respectively, so that the gap between the substrates is rendered substantially uniform in both the display region and the peripheral region, hence ensuring a visually satisfactory color display.

EXAMPLE 8

The entire surface between the periphery region and the seal in Example 7 was covered with a light shielding layer, whereby the space between the seal and the display region could be widened even though the peripheral region was narrow, hence achieving further enhanced uniformity.

EXAMPLE 9

Light shielding layers formed by the dyeing process to a thickness of about 1.2 μm as in Example 4 were used in place of the light shielding layers and the color filters in Example 7, and both light shielding layers and color filters were formed to serve as the dyed color filters having a thickness of about 1.8 μm.

In this negative type LCD device also, the display region and the peripheral region were furnished with the color filters and the light shielding layers having the same pattern (same area) respectively, so that the gap between the substrates was rendered substantially uniform in both the display region and the peripheral region, whereby the uniformity of the background color was less conspicuous than in Example 4 and a visually satisfactory color display was attained.

EXAMPLE 10

In Example 9, the color filters and the light shielding layers were formed correspondingly to 1056×272 dots, and 960 column electrodes and 240 row electrodes were formed in the display region. However, in the peripheral region, the respective 16 electrodes were grouped together into a single wide electrode. Consequently, in the peripheral region, there were disposed three striped column electrodes on each of the left and right sides and one striped row electrode at each of the upper and lower positions, thereby enabling visual representation with 960×240 dots in the display region.

In this negative type LCD device also, the display region and the peripheral region were furnished with the color filters and the light shielding layers having the same pattern (same area) respectively, so that the inter-substrate gap in the display region was substantially uniform to eventually achieve a visually satisfactory color display.

EXAMPLE 11

Electrodes of ITO equal in pitch to striped 1056 column electrodes for color filters were electrodeposited on a glass substrate, and R-G-B three color filters having a thickness of 2.0 μm were formed by electrodeposition. And light shielding layers equal in thickness thereto were formed by printing in the space between the color filters.

An overcoat film of transparent acrylic resin was formed on the color filters, and further it was coated with ITO to a thickness of 240 nm and then patterned to form striped 272 row electrode groups. Subsequently a layer of polyimide was deposited to a thickness of 70 nm or so, and a rubbing process was executed to form an aligning film thereby constituting a row-electrode substrate.

Meanwhile, striped 1056 column electrode groups were formed on another glass substrate orthogonally to the aforementioned row electrode groups, and an insulator film of $SiO_2$-$TiO_2$ was formed on the entire surface to a thickness of 50 nm. Subsequently a layer of polyimide was deposited thereon to a thickness of 70 nm or so, and a rubbing process was executed to form an aligning film, thereby constituting a column-electrode substrate in such as a manner that liquid crystal molecules have a twist angle of 240° at the time of completion of a cell of combining the column-electrode substrate with the aforesaid row-electrode substrate.

The row-electrode substrate and the column-electrode substrate were combined with each other to manufacture an LCD device as in Example 7.

The device thus assembled had a capability of display with 960×240 dots.

In this negative type LCD device also, both the display region and the peripheral region are furnished with the color filters, light shielding layers and electrodes having the same pattern (same area) respectively, so that the inter-substrate gap in the display region becomes substantially uniform to consequently attain a visually satisfactory color display.

EXAMPLE 12

The entire surface between the periphery region and the seal in Example 11 was covered with a light shielding layer, whereby the space between the seal and the display region could be widened even though the peripheral region was narrow, hence achieving further enhanced uniformity.

EXAMPLE 13

A glass substrate was coated with ITO and then patterned to form striped 240 row electrode groups and thick-film light shielding layers were formed to a thickness of 1.2 μm by a dyeing process. Subsequently R-G-B three color filters having a thickness of 2.0 μm were formed by a dyeing method. Then, a layer of polyimide was deposited thereon to a thickness of 70 nm or so, and a rubbing process was executed to form an aligning layer, thereby constituting a column-electrode substrate.

Meanwhile, striped 960 column electrode groups were formed on another glass substrate in a manner to be orthogonal to the row electrode groups, and an insulator film of $SiO_2$-$TiO_2$ was formed to a thickness of 50 nm on the entire surface. Then a layer of polyimide was deposited thereon to a thickness of 70 nm or so, and a rubbing process was executed to form an aligning film, thereby constituting a row-electrode substrate in such a manner that liquid crytal molecules have a twist angle of 240° at the time of completion of a cell by combining the column-electrode substrate with the aforementioned row-electrode substrate.

Such row-electrode substrate and column-electrode substrate were assembled as in Example 7 to produce a dot matrix LC cell. Subsequently an LC cell for retardation compensation was superposed thereon as in Example 7, and a pair of polarizing plates were disposed on the two sides to manufacture a negative type LCD device having a display capacity of 912×208 dots.

Although a visually satisfactory display was achieved in this LCD device, there occurred, due to the existence of the thick color filters on the electrodes, some variations in the effective voltage applied substantially to the liquid crystal layer, so that the contrast was lower than that in Example 7 and the display quality was slightly inferior.

EXAMPLES 14–26

Instead of the retardation compensating LC cell used in Examples 1 to 13, an optical compensating sheet composed of a uniaxial polymer film of polycarbonate was superposed on each of the two surfaces of the dot matrix LC cell to manufacture an LCD device.

Such LCD device was connected to a driving circuit and then was-driven in the same manner as Examples 1 to 13. The resultant effects attained were similar to those in the foregoing examples.

EXAMPLES 27–39

Instead of the retardation compensating LC cell used in Examples 1-13, two optical compensating sheets composed of uniaxial polymer films of polycarbonate were superposed on one surface of the dot matrix LC cell to manufacture an LCD device.

Such LCD device was connected to a driving circuit and then was driven in the same manner as in Examples 1-13. The resultant effects attained were similar to those in Examples 1-13.

According to the present invention, as described hereinabove, the gap between the substrates can be maintained uniform with facility to eventually realize a visually satisfactory color display.

In particular, great effects are attainable by applying the present invention to the STN type LCD device where high uniformity is requisite with respect to the inter-substrate gap although there are ensured some advantages including satisfactory multiplexing display characteristics, wide viewing angle, high contrast and so forth. Similarly, remarkable effects can be achieved by applying the present invention to a ferro-electric LCD device.

With adoption of the constitution shown in FIGS. 1 and 2, color-filters for both the display region and the peripheral region can be produced by using the same mask or printing plate, hence realizing high productivity.

Furthermore, due to the additional provision of electrodes in the peripheral region as well, any variation in the inter-substrate gap is suppressed in the vicinity of the boundary between the peripheral region and the display region, whereby such inter-substrate gap is retained substantially uniform even at the outermost periphery of the display region, hence averting nonuniformity of the background color.

Particularly in the exemplary constitution of FIG. 2 where the frame-like light shielding layers and the color filters for the pixels therein are disposed in the peripheral region as well as in the display region, so that the gap control in the display region is made further uniform by applying a voltage to the peripheral pixels in a manner to keep them in a light-shielded state. Although the uniformity of the inter-substrate gap in the peripheral region is somewhat lower than that in the display region, since the peripheral region is so driven as to be kept in a light-shielded state, it is hardly recognized as the nonuniformity of the background color to eventually enhance the display quality. In addition, the display is rendered easier to be seen since the peripheral region is placed in a light-shielded state similarly to the light-shielded pixels in the display region.

It is to be understood that the present invention is not limited to the above embodiments and examples and may be applicable also to a variety of modifications for use in known LCD devices within the scope not impairing the effects of the invention.

We claim:

1. A color liquid crystal display device comprising:
    a substrate having a display region and a peripheral region;
    first groups of mutually opposed electrodes formed on the substrate in the display region;
    a plurality of first color filters formed in the display region, each of the first color filters occupying a first predetermined area;
    a plurality of first light shielding layers formed in the display region;
    a plurality of second color filters formed in the peripheral region, wherein each of the second color filters occupies a second predetermined area corresponding to 5% to 50% of the first predetermined area occupied by each of the first color filters; and
    a plurality of second light shielding layers formed in the peripheral region.

2. The color liquid crystal display device according to claim 1, wherein the first light shielding layers overlap the first color filters in the display region and the second light shielding layers overlap the second color filters in the peripheral region.

3. The color liquid crystal display device according to claim 1, wherein the first and second light shielding layers and the first and second color filters are comprised of thick films.

4. The color liquid crystal display device according to claim 1, further comprising second groups of mutually opposed electrodes formed on the substrate in the peripheral region.

5. The color liquid crystal display device according to claim 1, further comprising a liquid crystal layer having a twist angle of 160° to 300°, and a retardation compensator on said liquid crystal layer so as to compensate elliptical polarization derived from said liquid crystal layer.

6. A color liquid crystal display device comprising:
   a substrate having a display region and a peripheral region;
   first groups of mutually opposed electrodes formed on the substrate in the display region;
   a plurality of first color filters formed in pixel portions of the display region, each of the first color filters occupying a first predetermined area;
   a plurality of first light shielding layers formed between pixel portions in the display region;
   a plurality of second color filters formed in the peripheral region, wherein each of the second color filters occupies a second predetermined area corresponding to 5% to 50% of the first predetermined area occupied by each of the first color filters; and
   a plurality of second light shielding layers formed in the peripheral region.

7. The color liquid crystal display device according to claim 6, wherein the first light shielding layers overlap the first color filters in the display region and the second light shielding layers overlap the second color filters in the peripheral region.

8. The color liquid crystal display device according to claim 6, wherein the first and second light shielding layers and the first and second color filters are comprised of thick films.

9. The color liquid crystal display device according to claim 6, further comprising second groups of mutually opposed electrodes formed on the substrate in the peripheral region.

10. The color liquid crystal display device according to claim 6, further comprising a liquid crystal layer having twist angle of 160° to 300°, and a retardation compensator on said liquid crystal layer so as to compensate elliptical polarization derived from said liquid crystal layer.

11. A method of preparing a substrate for a color liquid crystal display device comprising:
   (1) a step of forming first color filters having a pattern to cover pixels in a display region of the substrate, and forming second color filters in a peripheral region which is outside of the display region, each of the second color filters occupying an area corresponding to 5% to 50% of an area occupied by each of the first color filters;
   (2) a step of forming first light shielding layers having a pattern to cover a portion other than the pixels in the display region of the substrate, and forming second light shielding layers in the peripheral region; and
   (3) a step of providing electrodes.

12. The method according to claim 11, wherein in the step (3), an overcoat layer is formed before the electrodes are provided.

13. The method according to claim 11, wherein in the step (2), the light shielding layers overlap the color filters in the display region and in the peripheral region.

* * * * *